United States Patent
Sinclair et al.

(10) Patent No.: US 7,721,600 B1
(45) Date of Patent: May 25, 2010

(54) FLOW MEASUREMENT APPARATUS AND METHOD

(75) Inventors: Franklin Sinclair, New Orleans, LA (US); David D. Williams, Claremore, OK (US); Fred D. Dunlap, Jr., Okmulgee, OK (US); Mark V. LaPlante, Tulsa, OK (US); Ronald R. Anderson, Broken Arrow, OK (US)

(73) Assignee: Eastech Flow Controls, Inc. OK (US)

( * ) Notice: Subject to any disclaimer, the term of this patent is extended or adjusted under 35 U.S.C. 154(b) by 427 days.

(21) Appl. No.: 11/687,128

(22) Filed: Mar. 16, 2007

Related U.S. Application Data

(60) Provisional application No. 60/783,668, filed on Mar. 17, 2006.

(51) Int. Cl.
*G01F 23/28* (2006.01)
(52) U.S. Cl. .................................. 73/290 V; 73/290 R
(58) Field of Classification Search ................ 73/290 R, 73/290 V, 215, 861.23, 861.25–861.26
See application file for complete search history.

(56) References Cited

U.S. PATENT DOCUMENTS

| | | | | |
|---|---|---|---|---|
| 4,034,607 A | * | 7/1977 | Martig, Jr. .................... | 73/215 |
| 4,202,211 A | * | 5/1980 | Perry ........................... | 73/227 |
| 4,367,652 A | * | 1/1983 | Venuso ......................... | 73/861 |
| 4,571,997 A | * | 2/1986 | Kepple et al. .................. | 73/215 |
| 5,091,863 A | * | 2/1992 | Hungerford et al. .......... | 700/283 |
| 5,506,791 A | | 4/1996 | Hungerford et al. | |
| 5,587,926 A | | 12/1996 | Chiu et al. | |
| 5,691,914 A | | 11/1997 | Randolph | |
| 5,852,240 A | * | 12/1998 | LeBlanc ....................... | 73/215 |
| 6,208,943 B1 | | 3/2001 | Randolph et al. | |
| D457,491 S | | 5/2002 | Kaiser et al. | |
| 6,427,532 B1 | * | 8/2002 | Keller ........................ | 73/290 V |
| 7,469,598 B2 | * | 12/2008 | Shkarlet et al. ........... | 73/861.18 |

\* cited by examiner

*Primary Examiner*—Daniel S Larkin
*Assistant Examiner*—Rodney T Frank
(74) *Attorney, Agent, or Firm*—Fellers, Snider, Blakenship, Bailey & Tippens, P.C.; Dennis D. Brown

(57) ABSTRACT

A flow measurement cartridge assembly for measuring liquid flow in a partially filled channel and a method for measuring liquid flow using the cartridge assembly, the cartridge assembly comprising: a frame for insertion into a discharge opening of the channel; a level detector secured in the frame for determining a liquid level in the channel; and at least one flow measurement device secured in the frame.

7 Claims, 2 Drawing Sheets

FLOW MEASUREMENT APPARATUS AND METHOD

FIELD OF THE INVENTION

The present invention relates to apparatuses and methods for measuring liquid flow in partially filled pipes and other channels. More particularly, but not by way of limitation, the present invention relates to apparatuses and methods for measuring velocities, rates, and other flow parameters in waste water treatment, irrigation, and other water and waste water systems.

BACKGROUND OF THE INVENTION

The systems heretofore used in the art for measuring the flow of water or waste water in a partially filled pipe or other channel have typically relied upon combinations of pressure cells and velocity sensors which are individually installed within the channel. In order to determine the depth of the flow in the partially filled channel, the pressure cell is mounted on the bottom of the channel to measure the amount of hydrostatic pressure head produced by the flowing fluid. Once the depth of fluid flow is known, the cross-sectional area of the flowing stream can be determined based upon the known cross-sectional shape and dimensions of the channel. The rate of fluid flow is then calculated by multiplying the cross-sectional area of the fluid flow by the flow velocity.

Unfortunately, the pressure cell systems heretofore used in the art have significant shortcomings. The accuracy of the pressure cell system depends upon the pressure cell being mounted precisely on the bottom of the channel and upon the pressure cell and the velocity sensor(s) being in precise vertical and horizontal alignment. Precisely mounting and aligning the pressure cell system components in the field is difficult and time consuming. In addition, considerable time and effort is required when using the prior art pressure cell systems for field calibration, validation, programming, and channel profiling. Moreover, the pressure cells used in these systems are highly susceptible to fouling and sediment build-up which affects the accuracy of the sensor and eventually renders the sensor inoperable. Consequently, the pressure cell must be frequently removed and cleaned.

One type of velocity sensor preferred for use in partially filled channels is a chordal, transit-time sensor comprising a pair of piezoelectric elements which are mounted on opposite sides of the channel. The elements must be beneath the fluid flow for operation and are typically mounted at a height of at least one-quarter, more preferably about one-third, of the vertical inside diameter of the channel. Transit-time velocity sensors are effective for determining the chordal velocity of the fluid across the entire path of the fluid flow. In addition, the sensor elements are highly resistant to fouling and are not susceptible to drift problems, variable water surface problems, or non-uniform particle distribution problems which are frequently encountered with other systems. The transit-time velocity sensor elements are also designed to prevent accumulation of rags, branches, and other debris.

Unfortunately, as indicated above, it has heretofore been difficult and time consuming to mount and precisely align the velocity sensor elements with each other and with the pressure cell for proper operation and accuracy.

As an alternative to the use of transit-time velocity sensors, trapezoidal flume structures have sometimes been used for measuring fluid flow in partially filled channels. Based upon the depth of flow through the trapezoidal flume, the rate of fluid flow can readily be determined using known flume equations recognized by the U.S. Bureau of Reclamation. Trapezoidal flumes are generally effective over a broad range and have a flat bottom design which is generally effective for preventing the accumulation of sediment or debris.

Although trapezoidal flume structures are resistant to fouling and sediment accumulation, the proper installation and alignment of these systems in the field is difficult and time consuming and typically requires that the operation of the water or waste water system in question be disrupted for a considerable period of time.

It is also known in the art that an ultrasonic transducer installed in the top of a partially filled pipe or other channel can be used to determine and monitor the fluid level in the channel by transmitting an ultrasonic signal directly downward onto the fluid surface. However, in addition to being difficult to properly install and align, the ultrasonic sensor systems heretofore known in the art have not been capable of operation, or have only been capable of limited operation, in many channel systems. Ultrasonic sensors typically require a minimum signal transmission distance of about 12 inches or more. Thus, in order to operate an ultrasonic level sensor in a partially filled channel, it has heretofore been necessary for the liquid level in the partially filled channel to remain at least one foot below the ultrasonic transducer. These systems therefore have generally not been acceptable for use, for example, in pipes having diameters of less than about 24 inches or in applications where the liquid level will sometimes rise to within at least one foot of the top of the channel.

Thus, a need currently exists for a flow measurement system for partially filled channels which is accurate over a broad range of flows and is not susceptible to fouling or sediment buildup. A need particularly exists for a system of this type which can be quickly and easily installed in existing or new channel systems while ensuring that all of the system components are properly and precisely oriented and aligned. There is also a need for a system for measuring flows in partially filled channels which can be installed and activated substantially without the need for field calibration, flow profiling, and field programming and which does not require a significant amount of field validation.

SUMMARY OF THE INVENTION

The present invention satisfies the needs and alleviates the problems discussed above. In one aspect, there is provided an inventive ultrasonic level sensor assembly which is capable of operation in generally any size channel or container for accurately determining liquid levels in the channel or container ranging from 0% to substantially 100% of full. The inventive ultrasonic level sensor assembly preferably comprises (a) an ultrasonic transmitter which is oriented for transmission of an ultrasonic signal horizontally in the top of the channel or container and (b) a reflector which deflects the horizontal signal vertically downward toward the fluid surface. In order to allow the inventive ultrasonic sensor assembly to continue to operate as the liquid level approaches the top of the channel or container, the reflector will preferably be spaced horizontally from the ultrasonic transmitter a sufficient length to account for the necessary signal transmission distance of the ultrasonic transmitter. Consequently, in most applications, the horizontal distance between the ultrasonic transmitter and the reflector will preferably be at least 12 inches.

In another aspect, there is provided a flow measurement apparatus comprising a cartridge assembly which can be removably inserted into a pipe or other flow channel. The cartridge assembly comprises a cartridge frame having a trapezoidal flume and a level sensor, both of which are preinstalled in the frame in correct orientation and alignment. The level sensor is preferably an inventive ultrasonic level sensor assembly of the type described above comprising an ultrasonic transmitter installed in the top portion of the frame for longitudinal transmission and a reflector positioned in the frame for directing the ultrasonic transmission signal downward onto the fluid surface.

The inventive cartridge assembly is preferably pre-sized for the specific application and can be conveniently inserted into any accessible channel discharge opening. As will be understood by those in the art, accessory discharge openings suitable for insertion of the cartridge assembly are commonly provided in water and waste water systems, for example, in manhole cavity structures. The cartridge assembly will preferably also include a built-in leveling device which will ensure that the cartridge is precisely installed in its correct horizontal and vertical orientation.

In another aspect, there is provided a dual range flow measurement apparatus which is similar to the inventive flow measurement apparatus described above but which also includes a velocity sensor which is preinstalled in the cartridge assembly. The velocity sensor is preferably a transit-time velocity sensor comprising a pair of velocity sensor elements which are preinstalled on opposite sides of the frame. Thus, when the fluid level within the channel is below the velocity sensor elements, the inventive dual range apparatus is operable for accurately measuring flow using the trapezoidal flume. However, when the liquid level is above the velocity sensor elements, the transit-time velocity sensor will be used for accurately determining flow within the channel.

Further aspects, features, and advantages of the present invention will be apparent to those in the art upon examining the accompany drawings and upon reading the following Detailed Description of the Preferred Embodiments.

DETAILED DESCRIPTION OF THE PREFERRED EMBODIMENTS

Figure 1:
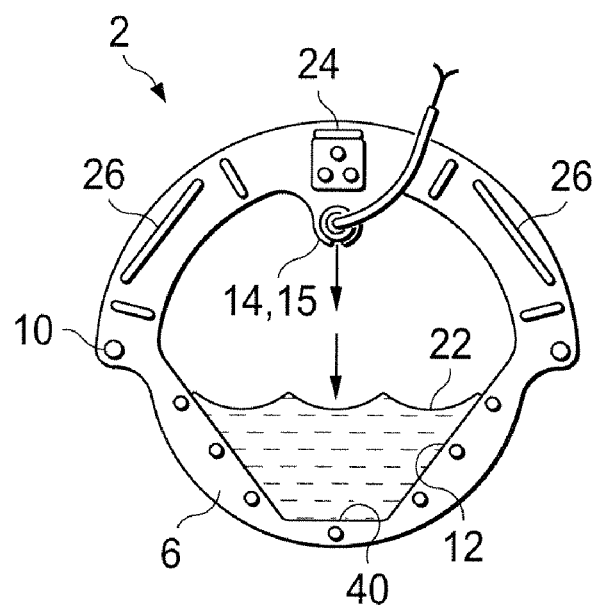
FIG. 1 is an elevational front view of a first embodiment 2 of the inventive flow measurement apparatus.
Figure 2:
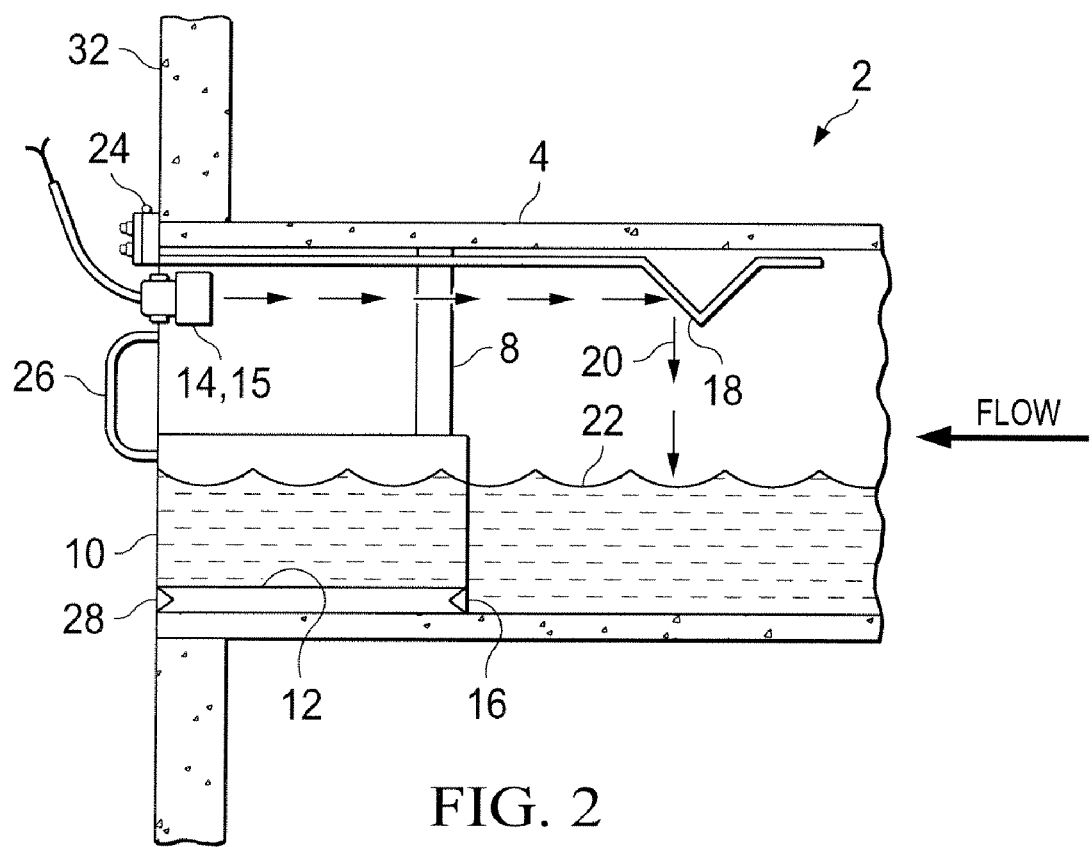
FIG. 2 is a cutaway elevational side view showing the inventive flow measurement apparatus 2 installed in a partially filled flow channel 4.

An embodiment 2 of the inventive flow apparatus utilizing an insertable cartridge assembly 6 is depicted in FIGS. 1 and 2. The cartridge assembly 6 comprises: a cartridge frame 8 having a flange 10 at its outer end; a trapezoidal flume 12 which extends from the outer flange 10 along a portion of the bottom of the frame 8; an ultrasonic transducer 14 secured to the outer flange 10 and oriented for transmitting an ultrasonic signal 16 longitudinally adjacent to the top of the frame 8; a reflecting surface 18 provided in the top of the frame 8 for directing the longitudinal/horizontal ultrasonic signal 16 vertically downward onto the fluid surface 22 as illustrated by the signal direction arrows 20; a leveling bubble element 24 secured in proper alignment to the outer flange 10 to correctly indicate the true horizontal and vertical alignment of the cartridge assembly 6; and a pair of outer handles 26 provided on the flange 10 for inserting and removing the cartridge assembly 6 and for rotating the cartridge assembly 6 to achieve the correct vertical and horizontal alignment as indicated by the leveling element 24.

In FIG. 2, the cartridge assembly 6 of the inventive system 2 is shown as inserted into an outlet opening 28 of a pipe of other flow channel 4 which discharges into a manhole cavity 32. Given the size of the flow channel 4, the inventive cartridge assembly 6 can be completely preassembled and all of the components thereof can be precision aligned, precalibrated, and preprogrammed at the factory prior to delivery and installation. The inventive system 2 will also preferably include a flow meter, a flow chart, or a combination thereof (not shown) which can be of generally any type known in the art for displaying, logging, and/or transmitting fluid flows, levels, velocities, and/or other desired parameters.

The inventive ultrasonic level sensor assembly 15 comprising (a) the ultrasonic transducer 14 which transmits a horizontal signal 16 above the fluid surface and (b) the reflector 18 which redirects the ultrasonic signal downwardly toward the fluid surface, is particularly well suited for use in the inventive flow measurement system 2. However, it also will be understood that the inventive ultrasonic level sensor assembly 15 can alternatively be installed and used independently for determining levels in pipes or other channels, containers, tanks, or other systems. The inventive ultrasonic level sensor assembly 15 is accurate to within ±0.02 inches and is not susceptible to the fouling and sediment buildup problems experienced with the prior art pressure sensor assemblies.

In the inventive level sensor assembly 15, the ultrasonic transducer 14 is preferably positioned for transmitting the ultrasonic signal 16 horizontally above the fluid surface 22 and the reflector surface 18 is preferably oriented at a 45 degree angle for reflecting the ultrasonic signal directly downward onto the fluid surface 22. In order to accurately determine the fluid level, the reflector surface 18 is horizontally spaced a known distance from the ultrasonic transducer 14.

In addition, to ensure that the inventive ultrasonic sensor assembly 15 will continue to operate as the fluid level 22 approaches the top of the flow channel, container, or other system, the horizontal distance from the transducer 14 to the reflecting surface 18 will preferably be greater than the minimum required transmission distance for the ultrasonic transducer 14. Thus, in most applications, the distance from the ultrasonic transducer 14 to the reflecting surface 18 will preferably be at least 12 inches. As the fluid level 22 approaches the top of the flow channel 4, the inventive flow measurement system 2 is preferably programmed to detect a full channel flow condition when the reflector surface 18 is submerged and the reflector ultrasonic echo is thus lost.

The reflector surface 18 can be formed of any material effective for redirecting the ultrasonic signal onto the fluid surface. In the inventive flow measurement system 2, the reflector surface 18 will preferably be a stainless steel surface provided by an upper support member 38 of the cartridge frame 8.

Using the built-in trapezoidal flume 12 provided in the bottom of the cartridge assembly 6 in conjunction with the inventive ultrasonic level sensor assembly 15, the rate of flow in the flow channel 4 can be determined to an accuracy of within ±3-5%. As indicated above, the determination of flow through the flume 12 is based upon known flow equations recognized by the U.S. Bureau of Reclamation. The trapezoidal flume system also provides accurate flow determinations over a broad turn down ratio (full to minimum flow) of 60:1. In addition, the flat bottom 40 of the trapezoidal flume 12 is effective for preventing fouling and sediment buildup.

Figure 3:
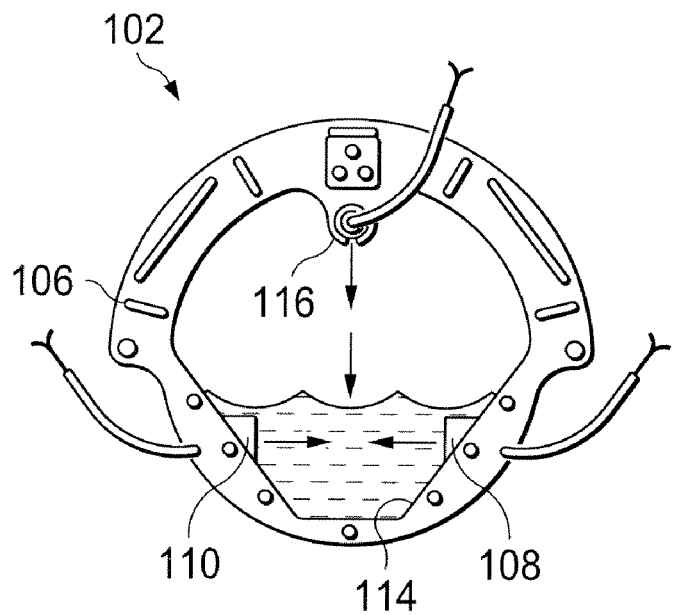
FIG. 3 is an elevational front view of a second embodiment 102 of the inventive flow measurement apparatus.
Figure 4:
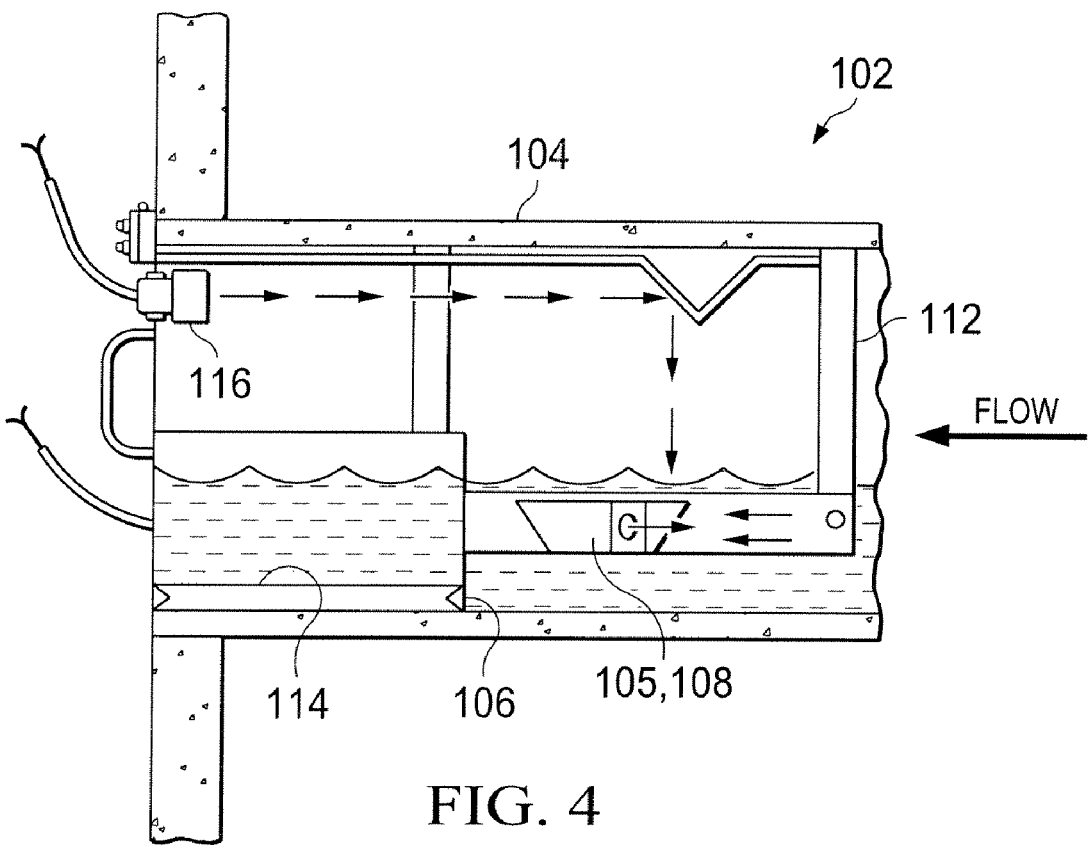
FIG. 4 is a cutaway elevational side view showing the inventive flow apparatus 102 installed in a partially filled flow channel 104.

A second embodiment 102 of the inventive flow measurement system is depicted in FIGS. 3 and 4. The inventive system 102 is essentially identical to the inventive system 2 except that the cartridge assembly 106 of the inventive system 102 also includes a transit-time velocity sensor 105 comprising a pair of transit-time velocity sensor elements 108 and 110 which are preinstalled on opposite sides of the cartridge frame 112 upstream of the built-in trapezoidal flume 114. The transit-time sensor elements 108 and 110 will preferably be vertically spaced above the bottom of the flow channel 104 a distance of at least one-fourth of the vertical inside diameter of the flow channel 104. The transit-time sensor elements 108 and 110 will more preferably be vertically positioned above the bottom of the flow channel 104 at about one-third of the vertical inside diameter of the flow channel 104.

The inventive system 102 is thus a dual range measurement device which (a) provides accurate flow measurement at levels below the velocity sensor elements 108 and 110 using the trapezoidal 114 and the ultrasonic level sensor assembly 116 and (b) accurately determines flow at fluid levels above the velocity sensor elements 108 and 110 using the transit-time velocity sensor 105 and the ultrasonic level sensor 116. The measurement accuracy of the inventive system 102 in the lower range is within ±3-5% with an effective turndown ration of 60:1. The measurement accuracy of the inventive system 102 in the upper range is within ±1-2% with an effective turndown ratio of 60:1. In addition, the inventive flow measurement system 102 is effective for accurately determining flow at liquid levels ranging from essentially 0% to 100% of full.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A cartridge assembly for measuring liquid flow in a partially filled channel comprising:
    a cartridge frame for insertion into a discharge opening of said channel;
    an ultrasonic level detector secured in an upper portion of said cartridge frame for determining a liquid level in said channel; and
    a trapezoidal flume secured in a bottom portion of said cartridge frame,
    wherein said ultrasonic level detector comprises an ultrasonic signal transmitter secured in said upper portion of said cartridge frame for transmitting an ultrasonic signal substantially horizontally in said cartridge frame and
    wherein said cartridge frame comprises an angled surface positioned for deflecting said ultrasonic signal downwardly.

2. The cartridge assembly of claim 1 wherein said angled surface is an angled surface of an upper support member of said cartridge frame.

3. The cartridge assembly of claim 2 wherein said angled surface is spaced horizontally from said ultrasonic signal transmitter a distance of at least 12 inches.

4. The cartridge assembly of claim 1 wherein said cartridge frame further comprises a flange at an outer end of said cartridge frame for abutting a perimeter of said discharge opening when said cartridge frame is inserted into said discharge opening.

5. The cartridge assembly of claim 4 further comprising at least one handle on said flange for gripping when inserting and positioning said cartridge frame in said discharge opening.

6. A cartridge assembly for measuring liquid flow in a partially filled channel comprising:
    a cartridge frame for insertion into a discharge opening of said channel;
    an ultrasonic level detector secured in an upper portion of said cartridge frame for determining a liquid level in said channel;
    a trapezoidal flume secured in a bottom portion of said cartridge frame; and
    a leveling device positioned on said cartridge frame in a manner such that, by inserting said cartridge frame into said discharge opening and rotating said cartridge assembly as needed to cause said leveling device to indicate a level position, said ultrasonic level detector and said trapezoidal flume will automatically be placed in proper position and alignment in said channel.

7. The cartridge assembly of claim 6 wherein said channel is a pipe and said discharge opening of said pipe opens into a manhole cavity.

* * * * *